United States Patent [19]

Kusaka et al.

[11] 4,241,926
[45] Dec. 30, 1980

[54] TONE ARM ASSEMBLY

[75] Inventors: Satoshi Kusaka, Tokyo; Kuninori Shino, Higashi-murayama, both of Japan

[73] Assignee: Sony Corporation, Tokyo, Japan

[21] Appl. No.: 36,992

[22] Filed: May 8, 1979

[30] Foreign Application Priority Data

May 8, 1978 [JP] Japan .................................. 53-54304
May 8, 1978 [JP] Japan .................................. 53-54305

[51] Int. Cl.³ .............................................. G11B 3/10
[52] U.S. Cl. .................................................. 274/23 R
[58] Field of Search ............... 274/23 R, 23 A, 15 R, 274/13 R, 9 R

[56] References Cited

U.S. PATENT DOCUMENTS 4,138,121  2/1979  Nakajima ........................... 274/23 R
4,170,360  10/1979  Ohsawa ............................. 274/23 R Primary Examiner—Harry N. Haroian
Attorney, Agent, or Firm—Lewis H. Eslinger; Alvin Sinderbrand

[57] ABSTRACT

Apparatus for controlling a tone arm is provided with a horizontal drive motor for moving the tone arm in the horizontal direction, a horizontal velocity detector connected to the same rotating shaft as the tone arm so as to move concurrently with both the tone arm and the horizontal drive motor, a control circuit having a motional feedback loop to energize the horizontal drive motor in accordance with a desired pre-set velocity signal and a fedback detected velocity signal.

13 Claims, 5 Drawing Figures

TONE ARM ASSEMBLY

BACKGROUND OF THE INVENTION

1. Field of the Invention

This invention relates generally to a tone arm assembly for a record player and, more particularly is directed to a novel apparatus for such a tone arm assembly, whereby the horizontal movement and also the vertical movement are controlled servo-controlled motors.

2. Description of the Prior Art

A control apparatus for a tone arm assembly is known that uses one or more motors to move a tone arm in the horizontal and vertical directions relative to the surface of a record disc. For example, such apparatus includes a horizontal drive motor for moving the tone arm from its so called rest position to a playing position disposed above the record disc during a lead-in operation and for returning the tone arm back to its rest position during a lead-out operation after completing a reproducing or playing operation of the record. Such apparatus also includes a vertical drive motor for moving the tone arm in the vertical direction, that is, for lowering the tone arm onto the record disc and for lifting the tone arm therefrom. It is desirable, in such apparatus for the tone arm to move at a constant velocity from its rest position to a record reproducing position or from a record playing final position to its rest position. To this end, there is provided a so-called constant velocity servo circuit such that the moving or actual velocity of the tone arm is detected and this detected output is used to control the motor to maintain constant velocity. One type of velocity detector which has been proposed for a constant velocity servo circuit includes the combination of a slit plate movable with the motor or tone arm and having a plurality of slits therein and a light emitting element and a light sensing element, the latter elements being positioned with the slit plate interposed therebetween, as described in U.S. Ser. No. 923,455 assigned to the assignee of this invention. This optical detecting device is arranged to operate by producing pulse signals whose widths are a function of the tone arm velocity and detecting the widths of these pulses. The servo circuit operates to increase the motor velocity when the pulse widths become wide and to decrease the motor velocity when the pulse widths become narrow. Such detecting device and servo circuit, however, have a mechanical-electrical converter and a circuit for accurately detecting pulse widths, so that the construction of such apparatus is relatively complicated. Further, since the drive motor and the detecting device generally are unbalanced in weight, if they are mounted on, for example, the drive shaft for the tone arm, there is a possibility that such use, over a prolonged period of time, may result in undesired transformation of the bearing of the tone arm.

In a tone arm control apparatus, the completion of the record-playing operation must be sensed to initiate a lead-out operation. This is generally accomplished by detecting the horizontal velocity of the tone arm which is increased when the tone arm tracks the final spiral groove of the record disc. This tone arm velocity sensing operation is performed by a velocity detector which typically is separate from the servo circuit velocity detector, with the result that the overall construction becomes even further complicated.

OBJECTS AND SUMMARY OF THE INVENTION

Accordingly, it is an object of this invention to provide tone arm control apparatus that avoids the above-described difficulties encountered with the prior art.

More particularly, it is an object of this invention to provide a tone arm control apparatus having a horizontal drive motor for moving a tone arm in the horizontal direction with respect to a record disc, a motor control circuit, an electro-magnetic horizontal velocity detector coupled to the tone arm shaft for generating a voltage in response to movement of the tone arm, the generated voltage being fed back to the motor control circuit.

It is still another object of this invention to provide a tone arm control apparatus including an electro-magnetic detector for detecting a vibration of the tone arm, and a servo circuit supplied with an output from the detector so as to concel such vibration of the tone arm.

It is yet another object of this invention to provide a tone arm control apparatus having a motor for the drive tone arm and an electro-magnetic velocity detector disposed symmetrically with respect to the motor for detecting the tone arm, velocity in which the motor and the detector are weight balanced to reduce possible abrasion of the tone arm support bearing.

It is a further object of this invention to provide a tone arm control apparatus having a drive motor for moving the tone arm in the horizontal direction and an electro-magnetic velocity detector for detecting the horizontal velocity of the tone arm, the motor and detector being arranged so as not to electro-magnetically affect to each other, thereby improving the velocitydetecting efficiency of the apparatus.

It is still a further object of this invention to provide a tone arm control apparatus having an electro-magnetic velocity detector for detecting the velocity of the tone arm directly to produce an output voltage adopted to control the movement of the tone arm.

It is yet a further object of this invention to provide a servo control circuit for a tone arm control apparatus which is readily adapted to detect the arrival of a tone arm at the final groove on a record disc.

In accordance with an aspect of this invention, apparatus is provided for controlling a tone arm, comprising a rotatable shaft for supporting the tone arm, a horizontal drive motor coupled to the tone arm for driving the tone arm in the horizontal direction with respect to a record disc, a horizontal motor drive circuit including a servo circuit for energizing the horizontal drive motor in such a manner that the tone arm is moved between at least a reset position and a reproducing position relative to the record disc, and a horizontal velocity detector coupled to the tone arm for detecting the horizontal velocity of the tone arm, wherein an output voltage generated by the detector is supplied to the servo circuit so as to suppress detected horizontal vibrations of the tone arm by means of the horizontal drive motor. The horizontal velocity detector comprises a permanent magnet and a coil disposed in the magnetic field of the permanent magnet, wherein either the permanent magnet or the coil is mechanically coupled to the tone arm, and the horizontal velocity detector and the horizontal drive motor are positional oppositely to each other with respect to the shaft, whereby the coil generates the output voltage supplied to the servo circuit in response to horizontal movement of the tone arm.

The above, and other objects, features and advantages of this invention will be apparent in the following detailed description of an illustrative embodiment of the invention which is to be read in connection with the accompanying drawings.

DETAILED DESCRIPTION OF A PREFERRED EMBODIMENT

Figure 1:
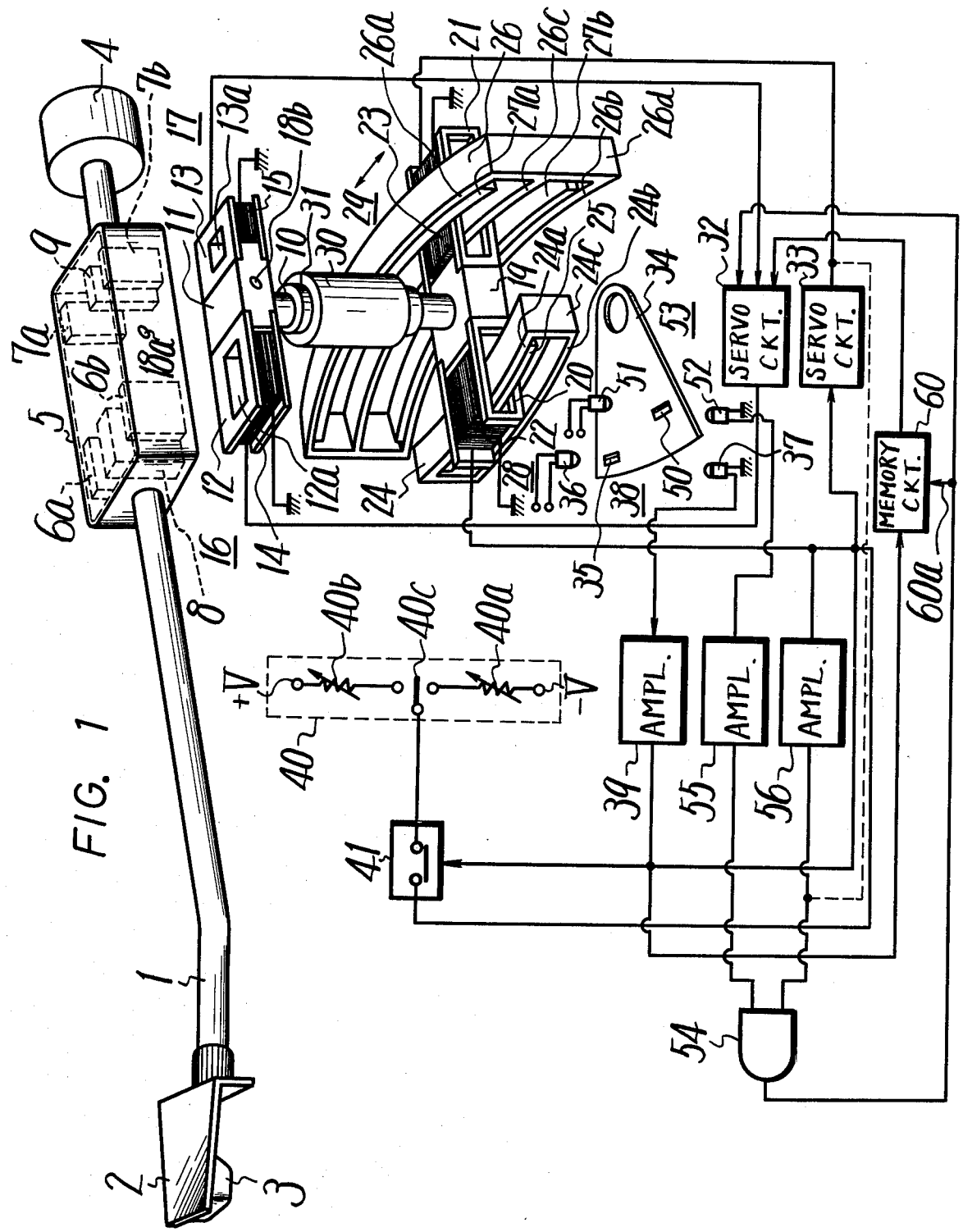
FIG. 1 is an exploded perspective view of one example of a tone arm assembly which can be used with this invention.

Referring to the drawings in detail and, initially to FIG. 1 thereof, there is shown one embodiment of a tone arm assembly in accordance with invention, comprised of a tone arm 1, a cartridge support element or head shell 2 and a cartridge 3 mounted on the head shell. The tone arm 1 is provided at a predetermined position along a limited portion of the length of the tone arm at its rear end with a counter weight 4, which may be omitted in accordance with one aspect of this invention. A housing 5, with an open bottom is provided intermediate forward and rear portions of tone arm 1, which portions are seen to be fixed to opposite (forward and rearward) sides of housing 5 so as to extend outwardly therefrom. A pair of oppositely-poled permanent magnets 6a and 6b are provided in opposition or face-to-face to each other on the inner walls of housing 5 at its forward side, and a pair of oppositely-poled permanent magnets 7a and 7b are provided in opposition or face-to-face to each other on the inner side walls of the housing at its opposite or rearward side. Magnetic members 8 and 9 are respectively disposed between magnets 6a and 6b and between magnets 7a and 7b to form individual magnetic circuits. If housing 5 is made of a magnetic material, magnetic members 8 and 9 can be formed in an integral manner with the housing. In this case, housing 5 will serve both as a magnetic circuit and as a yoke.

A rotatable shaft 10 is provided to which a coupling member 11 is secured at the upper end thereof. Coupling member 11 is thus insertable into housing 5 such that when shaft 10 rotates, the coupling member, and thus tone arm 1, rotates in the horizontal direction integrally with the rotation of shaft 10. Coupling member 11 is provided, at its forward and rearward sides, with bobbins 12 and 13 having center openings 12a and 13a, respectively, for receiving magnetic members 8 and 9 when the coupling member is mounted into housing 5. Bobbin 12 is wound thereabout with a vertical drive coil 14 and bobbin 13 is wound thereabout with a vertical velocity detection coil 15. Magnets 6a and 6b, magnetic member 8 and vertical drive coil 14 form, in combination a vertical drive motor 16, which is adapted to move tone arm 1 in the vertical direction with respect to a record disc (not shown) so as to bring the tone arm, or more precisely, cartridge 3 of the tone arm, into and out of contact with the record disc. Further, magnets 7a and 7b, magnetic member 9 and vertical velocity detection coil 15 form, in combination a vertical velocity detector 17, which is adapted to detect the velocity of tone arm 1 in the vertical direction and additionally, to produce a signal which can be used to brake vertical drive motor 16 for preventing low frequency resonance of tone arm 1 in the vertical direction. Vertical drive motor 16 and vertical velocity detector 17 are symmetrically disposed with respect to shaft 10 so as to avoid electrical or magnetic interaction therebetween. A longitudinal side wall of housing 5 and the corresponding side of a coupling member 11 are respectively bored with apertures 18a and 18b at positions which align with each other. When coupling member 11, having bobbin 12 wound with vertical drive coil 14 and bobbin 13 wound with the vertical detection coil 15, is inserted into housing 5 so that magnetic members 8 and 9 fit respectively into openings 12a and 13a of the bobbins 12 and 13, a vertical-rotation pivot shaft (not shown) is inserted into aperture 18a of housing 5 and aperture 18b of coupling member 11 to provide a vertical rotation axis for tone arm 1. In addition, if the positions of vertical drive motor 16 and vertical velocity detector 17 are interchanged and if the location of the vertical-rotation pivot shaft is properly selected, zero balance can be maintained without counter weight 4 so that the latter may be omitted.

Another coupling member 19 having bobbins 20 and 21 at its opposite ends is provided at the lower end of horizontal rotation shaft 10. Bobbin 20 is wound thereabout with a horizontal detection coil 22, and bobbin 21 is wound thereabout with a horizontal drive coil 23. There is also provided a yoke assembly 24 formed of upper and lower yoke members 24a and 24b and connecting yoke members 24c. The upper yoke member 24a has a permanent magnet 25 secured to its inner or lower surface, and this permanent magnet is received by and passes through bobbin 20. When bobbin 20 moves along yoke assembly 24, as when shaft 10 rotates to rotate tone arm 1, a voltage is generated across coil 22 wound about bobbin 20 in response to the horizontal movement of tone arm 1, that is, when coil 22 moves through the magnetic field derived from magnet 25. There is also provided another yoke assembly 26 formed of upper and lower yoke members 26a and 26b, a center yoke member 26c and connecting yoke members 26d. The center yoke member 26c is received by and passes through bobbin 21 which is wound with horizontal drive coil 23. Permanent magnets 27a and 27b are respectively fixed to the inner surfaces of the upper and lower yoke members 26a and 26b. Yoke assembly 26 thus generates a magnetic field in which horizontal drive coil 23, wound about bobbin 21, is disposed, whereby yoke assembly 26 is electro-magnetically coupled to horizontal drive coil 23 and bobbin 21 to reciprocate the bobbin in the directions indicated by the arrow in response to a drive current flowing through coil 23. The upper, lower and center yoke members 26a, 26b and 26c of yoke assembly 26 are formed as coaxial circular arcs about the axis of the horizontal rotation shaft 10, and bobbin 21 wound thereabout with horizontal drive coil 23 is adapted to reciprocate with respect to yoke assembly 26 as mentioned above without touching the center yoke 26c.

Horizontal detection coil 22, yoke assembly 24 and magnet 25 form, in combination, a horizontal velocity detector 28 adapted to detect the velocity of a horizontal drive motor 29, which will be described below, and also to produce a signal which can be used to brake this motor 29. Further, horizontal drive coil 23, yoke assembly 26 and magnets 27a and 27b form, in combination, the just-mentioned horizontal drive motor 29. Horizontal drive motor 29 is adapted to rotate shaft 10 and thereby drive tone arm 1 in the horizontal direction. Thus, the tone arm can be led in from its rest position to a predetermined position above the surface of the record disc, can be led out, returned and properly positioned, all in conjunction with a reproducing operation. Also, horizontal drive motor 29 is operative to cancel an inside force and to control a horizontal component of the low frequency resonance of the tone arm. The horizontal drive motor is symmetrically disposed with horizontal velocity detector 28 about horizontal rotation shaft 10 so as to avoid electrical or magnetic interaction therebetween.

Shaft 10 is held firmly against vertical movement by a member such as a sleeve 31, but is permitted to rotate through, for example, ball bearings by a base member 30, which is mounted on a board (not shown) on which the chassis (also not shown) of the apparatus is placed. Yoke assembiles 24 and 26 are also fixed to base member 30 and may be integrally constructed therewith.

The apparatus of FIG. 1 is provided, additionally, with vertical and horizontal servo circuits 32 and 33. Servo circuit 32 is adapted to feed back a detected current derived from vertical detection coil 15 to vertical drive coil 14 to achieve a so-called motion feed back (hereinafter referred to as MFB). Similarly, servo circuit 33 has a feedback loop supplied with a detected current derived from horizontal detection coil 22 and functions to energize horizontal drive coil 23 to achieve MFB. These servo circuits 32 and 33 are connected to MFB operating switches (not shown) to be externally operable by a user, if desired.

A shutter plate 34 is coupled to horizontal rotation shaft 10 and rotates in synchronism therewith. Shutter plate 34 is provided therethrough with a window 35, which is disposed in a corresponding predetermined position when tone arm 1 rotates to a playing position relative to the record disc which is dependent on the diameter of the record disc. A light emitting element 36 and a light sensing element 37 are disposed on opposite sides of shutter plate 34 such that when the tone arm (together with the shutter plate) rotates to a predetermined playing position, window 35 is aligned with light emitting element 36 and light sensing element 37. These elements 36 and 37 and shutter plate 34 are combined to form an optical position sensor detector 38 adapted to sense when tone arm 1 reaches a predetermined position. An amplifier 39, including a signal comparator is connected between the output of light sensing element 37 and the input of horizontal servo circuit 33, and produces a position output signal which is supplied to servo circuit 33 when the amplitude of the position signal from position detector 38 (that is, from element 37) becomes equal to a pre-set reference signal corresponding to a desired position of the tone arm.

In order to establish the horizontal rotating velocity of tone arm 1, there is provided a velocity setting circuit 40, comprised of a first variable means element, such as a variable resistor 40d, for moving the tone arm 1 in a predetermined direction at a constant velocity, a secnd variable element, such as a variable resistor 40b, for moving the tone arm 1 in a direction opposite to the former at a constant velocity, and a change-over switch 40c for establishing a desired horizontal velocity for tone arm 1 in either of the predetermined directions. The first variable element 40a is connected to a source of operating voltage-V and the second variable element 40b is connected to a source of operating voltage +V.

Switch 40c, which is selectively engageable with one or the other of elements 40a and 40b, is connected to the input of servo circuit 33 through a normally closed switch circuit 41, which is adopted to be opened when the output of position detector 38 is supplied thereto through amplifier 39. The output of amplifier 39 is also connected to the input of servo circuit 33 and is further connected to a memory circuit 60. Memory circuit 60 may thus comprise a bistate device having one input, for example, a set input, connected to amplifier 39 and another input, for example, its reset input 60a, connected to an AND gate 54, to be described. The output of memory circuit 60 is connected through servo circuit 32 to the vertical drive motor. When memory circuit 60 admits of one state, such as its set state servo circuit 32' based upon the output of amplifier 39 being stored in memory 60, operates to energize vertical drive motor 16 to lower tone arm 1 onto the surface of the record disc. Upon completion of the reproducing operation of the record disc by tone arm 1, memory circuit 60 is reset with signal fed through a reset terminal 60a to cut off the input to circuit 32. As will be later described, servo circuit 32 then energizes vertical drive motor 16 to reverse the rotation thereof so that tone arm 1 is lifted from the surface of the record disc.

Shutter plate 34 is further provided with a second window 50 disposed along an arc having a radius which differs from that at which window 35 is disposed. This window 50 is used to determine the occurrence of the final sound groove on a record having, for example, a diameter of 30 cm. That is, when tone arm 1 rotates to the final sound groove, shutter plate 34 will be correspondingly rotated so that window 50 is positioned at a pre-established location. Associated with this window 50 is, a light emitting element 51 and a light sensing element 52 which are disposed at this pre-established location on opposite sides of shutter plate 34 so that a light emitted from light emitting element 51 passes through window 50 and impinges upon at light sensing element 52 when cartridge 3 reaches the final reproducing position of the record disc. These elements 51 and 52 and shutter plate 34 combine to form another optical position detector 53 adapted to sense when the tone arm reaches its final-groove position. An AND gate 54 is provided with a pair of inputs which are connected through an amplifier 55 to the output of light sensing element 52 and through an amplifier 56 to the output of horizontal detection coil 22, respectively. Thus, amplifier 55 is adapted to sense when light from element 51 impinges upon light sensing element 52 and amplifier 56 is adapted to sense when the voltage produced by coil 22 increases above a predetermined threshold level. When the outputs from light sensing element 52 and horizontal detection coil 22 are both fed to AND gate 54, that is, when tone arm 1 reaches its final-groove position and when the velocity of the tone arm is significantly increased as when the tone arm tracks the final groove, AND gate 54 supplies an output control signal through servo circuit 32 to vertical drive coil 14. AND gate 54 also supplies a reset signal to memory 60.

Figure 2:
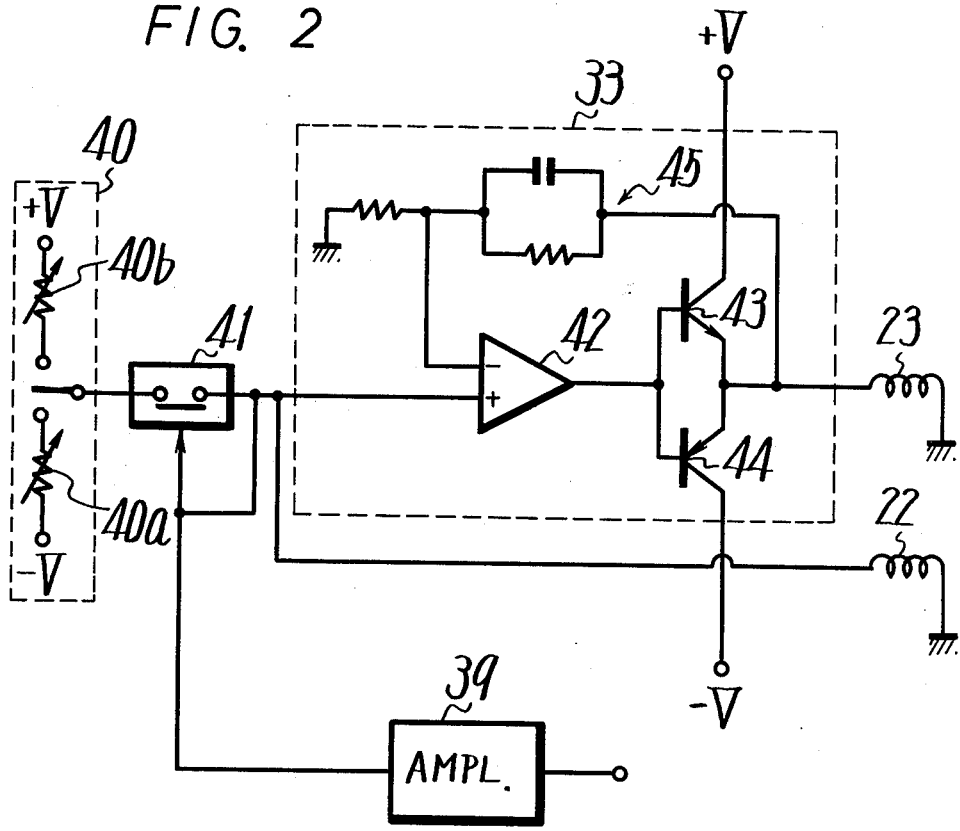
FIG. 2 is a schematic circuit diagram of the horizontal servo circuit used in FIG. 1.

An embodiment of servo circuit 33 is shown in FIG. 2. As comprising an operational amplifier 42 having positive (non inverting) and negative (inverting) inputs, NPN and PNP switching transistors 43 and 44 the bases of which are connected in common to the output of amplifier 42, and a feedback circuit 45 provided between the common-connected emitters of transistors 43 and 44 and the negative input of operational amplifier 42. The positive input of operational amplifier 42 is connected in common to horizontal detection coil 22, the output of the amplifier 39, and switch circuit 41. The emitters of transistors 43 and 44 are also connected to horizontal drive coil 23 of horizontal drive motor 29. Further, the collector of transistor 43 is supplied with an operating voltage $+V$ and the collector of transistor 44 is supplied with an operating voltage $-V$. The gain of operational amplifier 42 may be adjusted, as desired, by suitably adjusting a feedback resistance of the amplifier. This means that the velocity of tone arm 1 can be set to a predetermined value.

The operation of the above tone arm assembly, in accordance with this invention, will now be described. In the lead-in mode wherein tone arm 1 is moved from its rest position to a predetermined play position above the surface of the record disc, it is assumed that servo circuit 33 is in an operative condition and switch 40c of the velocity setting circuit 40 is connected to variable element 40a. Hence, a negative voltage of magnitude determined by the setting of element 40a is supplied through switch circuit 41 to the positive input of operational amplifier 42 and the output of operational amplifier 42 is fed to the base of the transistor 44 as a consequence thereof, transistor 44 is rendered conductive and negative current flows from ground to horizontal drive coil 23 through the collector-emitter path of transistor 44. Thus, servo circuit 33 produces an output signal corresponding to a voltage set by variable element 40a. Accordingly, the tone arm 1 is moved from its rest position toward the predetermined play position above the surface of the record disc by horizontal drive motor 29 to represent its lead-in state. In this lead-in state of tone arm 1, an tone arm 1 is moved by the rotation of shaft 10 and horizontal detection coil 22 correspondingly moves through the magnetic flux generated by permanent magnet 25 to produce an output voltage corresponding to the velocity of tone arm 1 which is fed to operational amplifier 42. Accordingly, when the horizontal velocity of tone arm 1 is too fast, the output voltage of detection coil 22 increases, thereby affecting the output of operational amplifier 42 to increase the impedance of transistor 44. As a result, the current flowing through coil 23 of horizontal drive motor 29 is decreased to reduce the horizontal velocity of tone arm 1.

When the lead-in operation has advanced tone arm 1 to its predetermined play position, whereat cartridge 3 is located above the information portion of the record disc, shutter plate 34, which rotates with shaft 10, reaches a position where the light from light emitting element 36 passes through window 35 to light sensing element 37. As a result, element 37 produces a detected signal representing that, tone arm 1 has attained its predetermined play position, which is fed to the amplifier 39. When this input signal that is supplied to amplifier 39 reaches a predetermined value, the amplifier 39 produces an output signal which opens switch circuit 41 and is also fed to operational amplifier 42. Thus when tone arm 1 is moved to this predetermined position, the bias voltage fed to servo circuit 33 from velocity setting circuit 40 is interrupted. However, servo circuit 33 and, more particularly, operational amplifier 42, is simultaneously supplied with the output signal of amplifier 39 and the output voltage of coil 22, the latter being a function of the horizontal velocity of the tone arm. Thus, operational amplifier 42 produces an output signal which renders transistor 44 non-conductive and renders transistor 43 conductive so that a reverse current flows through coil 23 of horizontal drive motor 29 from source $+V$, through the collector-emitter circuit of transistor 43, to stop movement of the tone arm. It will be noed that since the output voltage from coil 22 and the output signal from amplifier 39 are simultaneously fed to servo circuit 33, a stopping force sufficient to counteract the rotation of motor 29 is obtained. This means that if horizontal drive motor 29 is rotated at a higher velocity, a larger stopping force will be applied thereto. This stopping or braking force may be analogous to a viscous resistance and may be expressed as an attenuation term in the so called equation of which is expressed as follows:

$$m\frac{d^2x}{dt^2} + kx + c\frac{dx}{dt} = 0 \tag{1}$$

A solution of this equation is obtained as follows: If $$\zeta = \frac{c}{2\sqrt{mk}} < 1,$$

then $$x = x_0 e^{-\zeta \omega t} \cos(\sqrt{1-\zeta^2} \cdot \omega t - \phi) \tag{2}$$

If $\xi = 1$, $$x = (A = Bt)e^{-\omega t} \tag{3}$$

If $\xi > 1$, $$x = e^{-\zeta \omega t}(Ae^{\omega\sqrt{\zeta^2-1}\cdot t} + Be^{-\omega\sqrt{\zeta^2-1}\cdot t}) \tag{4}$$

In the foregoing equations, $x_O$, A, B and $\phi$ are constants determined by the initial conditions of the tone arm. The above equations (1), (2) and (3) all include an attenuation term. Thus, it is to be recognized that tone arm 1 is quickly at its desired play position by the simultaneous application of MFB and positioning servo operations.

When tone arm 1 is stopped at its predetermined horizontal position, the corresponding output from amplifier 39 is applied to memory circuit 60 to set the same. The set output of memory circuit 60 is then fed through vertical servo circuit 32 to vertical drive motor 16 so that cartridge 3 of tone arm 1 is lowered onto the surface of the record disc. The information recorded on the record disc can thus be reproduced.

During the reproducing operation of the record disc, if tone arm 1 undergoes an abnormal vibration in the horizontal direction due to, for example, warping or eccentricity of the record disc, or if the tone arm is subjected to a low frequency resonance in the horizontal direction, horizontal detection coil 22 generates a corresponding voltage in response to such conditions. This voltage is fed to servo circuit 33 which, in turn, varies the energization of horizontal drive motor 29 to control it so as to cancel such resonance or vibration. As a result, unwanted vibrations in tone arm 1 are prevented. Similarly, when tone arm 1 undergoes abnormal vibration in the vertical direction, vertical detection coil 15 produces a voltage in response thereto. This voltage is fed to servo circuit 32 which, in turn, varies the energization of vertical drive motor 16 to control it so as to cancel such vibration. Accordingly, such abnormal vibration of tone arm 1 in the vertical direction is also prevented.

Figure 3A:
FIGS. 3A, 3B and 3C are waveform diagrams of the signals derived from the detecting circuitry when the tone arm reaches the final groove of a record disc.
Figure 3B:
Figure 3C:
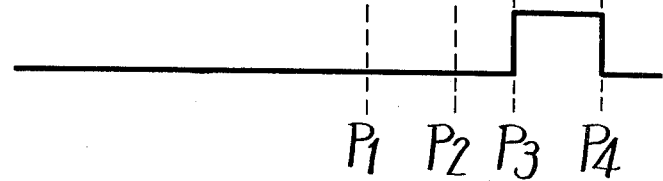

When tone arm 1 traces the sound groove of a record disc having a diameter, for example of, 30 cm and arrives at the final groove position (which is represented by $P_1$ in FIG. 3), tone arm 1 moves rapidly from its final groove position $P_1$ to a lead-out groove position (which is represented by $P_2$ in FIG. 3) horizontal detection and consequently, coil 22 produces the detected signal shown in FIG. 3B in response to this increase in velocity of the tone arm. At this time since window 50 of shutter plate 34 is synchronously moving with horizontal rotation shaft 10, shutter plate 34 relates to a position between the opposing elements 51 and 52 and light sensing element 52 generates an output pulse (FIG. 3A), the duration of which corresponds to the width of window 50 which is aligned with elements 51 and 52, that is, the amount of light passing through window 50 from element 51, and the speed at which shutter plate 34 rotates. Accordingly, the detected signal (FIG. 3B) of horizontal detection coil 22 and the output (FIG. 3A) of light sensing element 52 are applied through respective amplifiers 56 and 55 to AND gate 54. Thus, gate 54 is energized to supply an output signal to control servo circuit 32 to the vertical drive coil 14 so that energize tone arm 1 is lifted from the surface of the record disc. In addition, the output signal of AND gate 54 is supplied to terminal 60a to reset memory circuit 60 wherein the output of memory circuit 60 is made equal to zero.

A similar operation can also be achieved in the case of a record disc having a smaller diameter, for example, 17 cm. In this case, when tone arm 1 moves between the final sound groove position indicated by $P_3$ and a lead-out groove position indicated by $P_4$, horizontal detection coil 22 produces the detected signal shown in FIG. 3C. If should be appreciated that this signal produced by coil 22 occurs during the duration of the pulse output (FIG. 3A) from light sensing element 52 so that AND gate 54 is energized in the same manner as discussed above to effect the lifting of tone arm 1 from the record disc.

After the end detection, tone arm 1 is returned to its rest position by rotating horizontal drive motor 29 in the reverse direction.

Having described a specific preferred embodiment of the invention with reference to the accompanying drawings, it is to be understood that the invention is not limited to that precise embodiment, and that various changes and modifications may be effected therein by one skilled in the art without departing from the scope of spirit of the invention as defined in the appended claims.

We claim as our invention:

1. Apparatus for controlling a tone arm comprising:
   a rotatable shaft for supporting said tone arm;
   a horizontal drive motor for driving said tone arm in the horizontal direction with respect to a record disc;
   horizontal motor drive means for energizing said horizontal drive motor in such a manner that said tone arm is moved between at least a rest position and a reproducing position relative to the record disc; horizontal velocity detecting means coupled to said tone arm for detecting the horizontal velocity of said tone arm, said horizontal velocity detecting means including a permanent magnet and a coil disposed in the magnetic field of said permanent magnet, one of said permanent magnet and coil being mechanically coupled to said tone arm, and said horizontal velocity detecting means and said horizontal drive motor being positioned oppositely to each other with respect to said shaft; and
   means for supplying a voltage generated by said coil in response to horizontal movement of said tone arm to said horizontal motor drive means, whereby said horizontal drive motor is controlled to suppress detected horizontal vibrations of said tone arm.

2. Apparatus according to claim 1, in which said horizontal drive motor comprises a permanent magnet and a coil disposed in the magnetic field of said permanent magnet, one of said permanent magnet and coil of said horizontal drive motor is mechanically coupled to said tone arm, and said horizontal velocity detecting means and said horizontal drive motor are symmetrically positioned with respect to said shaft.

3. Apparatus according to claim 2, in which said coil of the horizontal drive motor and said coil of the horizontal velocity detecting means are both coupled to said shaft.

4. Apparatus according to claim 3, further comprising respective bobbins about which the respective coils of said horizontal drive motor and said horizontal velocity detecting means are wound; and a support member for supporting both of said respective bobbins, said support member being mechanically coupled to and rotatable with said shaft.

5. Apparatus according to claim 1, further comprising respective yoke assemblies for supporting the respective permanent magnets of said horizontal drive motor and said horizontal velocity detecting means and for directing the magnetic fields of said permanent magnets through said respective coils, said yoke assemblies being fixedly disposed relative to said shaft.

6. Apparatus according to claim 1, further comprising a vertical drive motor mechanically coupled to said tone arm for moving said tone arm in the vertical direction with respect to the record disc; vertical motor drive means for energizing said vertical drive motor in such a manner that said tone arm is moved between an inoperative position above the record disc and a reproducing position; vertical velocity detecting means for detecting the vertical velocity of said tone arm, said vertical velocity detecting means including a permanent magnet and a coil disposed in the magnetic field of said permanent magnet, one of said permanent magnet and coil of said vertical velocity detecting means being mechanically coupled to said tone arm and said vertical velocity detecting means and said vertical drive motor being positioned oppositely to each other with respect to said shaft; and means for supplying a voltage generated by said coil of said vertical velocity detecting means to said vertical motor drive means, whereby said vertical drive motor is controlled to suppress detected vertical vibrations of said tone arm.

7. Apparatus according to claim 6, in which said vertical drive motor comprises a permanent magnet and a coil disposed in the magnetic field of said permanent magnet, one of said permanent magnet and coil of the vertical drive motor is mechanically coupled to said tone arm, and said vertical velocity detecting means and said vertical drive motor are symmetrically positioned with respect to said shaft.

8. Apparatus according to claim 7, in which said coil of the vertical drive motor and said coil of the vertical velocity detecting means are symmetrically fixed to said shaft and the respective permanent magnets of said vertical drive motor and said vertical velocity detecting means are both moveable in the vertical direction.

9. Apparatus according to claim 6, further comprising position sensing means coupled to said tone arm for sensing when said tone arm reaches a final groove reproducing position of the record disc, and a gate circuit responsive to an output from said position sensing means corresponding to the sensing that said tone arm has reached said final groove reproducing position and to an output from said horizontal velocity detecting means corresponding to an increase in the horizontal velocity of said tone arm for supplying a signal to said vertical motor drive means to energize said vertical drive motor so as to lift said tone arm to said inoperative position.

10. Apparatus according to claim 8, further comprising a support member coupled to said tone arm and moveable in the vertical direction therewith, said support member supporting the respective permanent magnets of both said vertical drive motor and said vertical velocity detecting means.

11. Apparatus according to claim 10, further comprising respective bobbins about which the respective coils of said vertical drive motor and said vertical velocity detecting means are wound; support means coupled to said shaft for supporting said respective bobbins; and pivotal coupling means for pivotally coupling said support member to said support means such that said support member is pivotable in the vertical direction relative to said support means.

12. Apparatus according to claim 1, further comprising a vertical drive motor for moving said tone arm in the vertical direction to lower said tone arm onto a record disc and to lift said tone arm from said record disc; position sensing means coupled to said tone arm for detecting when said tone arm reaches a final groove reproducing position of said record disc and for producing an output in response thereto, and means responsive to said output from the position sensing means and to a concurrent increase in the horizontal velocity of said tone arm as detected by said horizontal velocity detecting means for energizing said vertical drive motor to lift said tone arm to an inoperative position.

13. Apparatus according to claim 12, in which said position sensing means comprises shutter means coupled to and rotatable with said shaft and having a window therein, and light emitting means and light sensing means fixedly disposed on opposite sides of said shutter means and aligned with each other such that light emitted from said light emitting means is transmitted through said window to said light sensing means when said tone arm, said shaft and said shutter means rotate to said final reproducing position of said tone arm.

* * * * *